United States Patent [19]
Smith

[11] 3,939,311
[45] Feb. 17, 1976

[54] MUTING CIRCUIT FOR SUBSCRIBERS TELEPHONE
[75] Inventor: James W. Smith, Elmhurst, Ill.
[73] Assignee: GTE Automatic Electric Laboratories Incorporated, Northlake, Ill.
[22] Filed: Oct. 23, 1974
[21] Appl. No.: 517,137

[52] U.S. Cl. .............................. 179/81 R; 179/84 T
[51] Int. Cl.² ........................................... H04M 1/00
[58] Field of Search ......... 179/84 R, 84 T, 81 R, 99

[56] References Cited
UNITED STATES PATENTS
2,392,321   1/1946   Hersey ............................... 179/84 T
2,686,844   8/1954   Brewer ............................... 179/81 R
2,972,021   2/1961   Bryant ............................... 179/158

FOREIGN PATENTS OR APPLICATIONS
1,178,695   1/1970   United Kingdom ............... 179/84 T Primary Examiner—William C. Cooper
Assistant Examiner—Joseph Popek
Attorney, Agent, or Firm—Robert J. Black

[57] ABSTRACT

A subscribers telephone circuit that includes automatic muting of signals reproduced by a transducer contained within the subset, each time the telephone's handset is removed from its cradle. The circuit employs electronic techniques to eliminate the need for additional contacts on the hook switch to provide the necessary muting.

7 Claims, 1 Drawing Figure

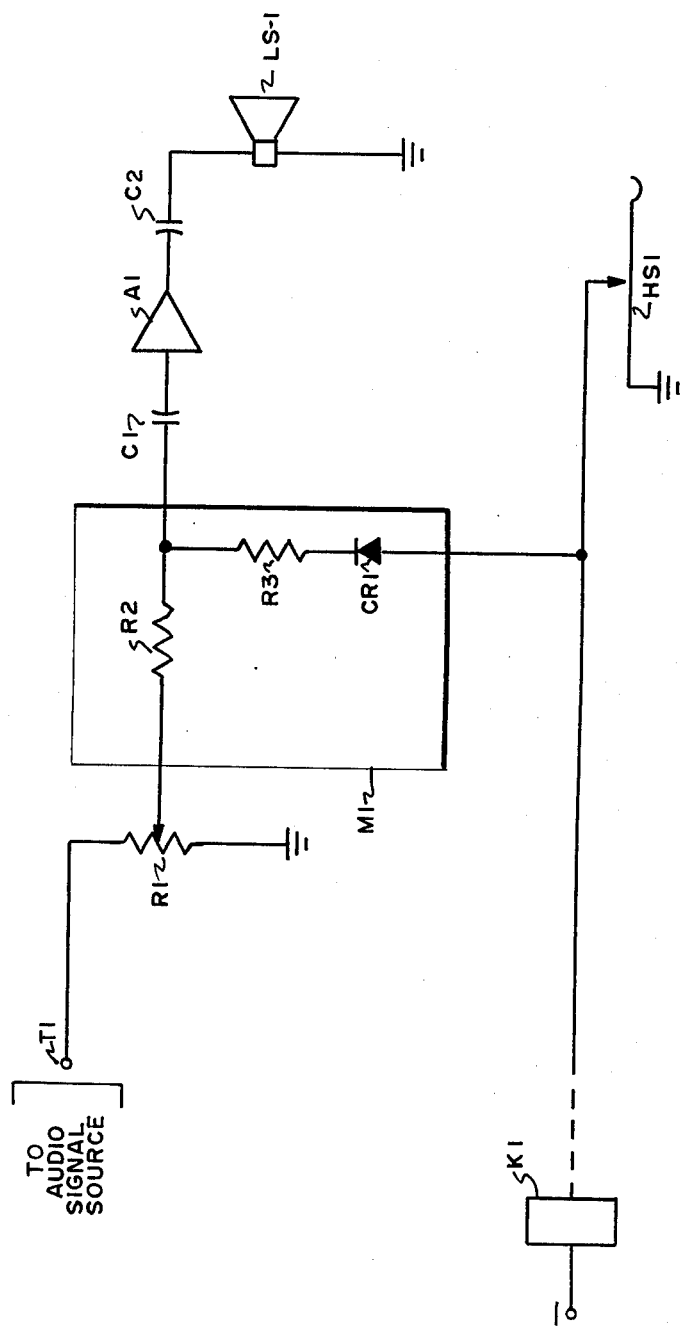

MUTING CIRCUIT FOR SUBSCRIBERS TELEPHONE

BACKGROUND OF THE INVENTION

1. Field of the Invention

The present invention is drawn to a telephone subscriber's subset and more particularly to the muting of signals in subscriber's subsets that utilize electronic tones. Such units involve audio amplifiers and speakers to replace the conventional electromechanical ringers usually found in subscriber's telephones.

2. Description of the Prior Art

With the advent of extensive use of electronic circuitry in the field of telephony, it has become common to utilize the receiver in telephone sets to reproduce incoming ringing signals as well as to perform the usual speech translating function. In such sets the receiver functions as a signaling reproducer while located on the hook switch. Obviously under certain conditions particularly that wherein the telephone is of a multi-line or key telephone type and connected to a plurality of lines, it is conceivable that a subscriber while utilizing the telephone to converse over one line might receive an incoming signal over another line with a resulting acoustic disturbance caused by the application of the incoming ringing signal to the receiver. Such an arrangement at best is highly unsatisfactory.

In other telephone substations a separate receiver transducer is utilized to reproduce incoming ringing signals, from that used to reproduce voice signals. However even in this situation incoming ringing signals may be disturbing to the subscriber utilizing the subset. Thus it is obvious that the problem of muting incoming ringing signals while a phone is being used is well known particularly in key telephone systems. A key telephone system as noted will often have the appearance of a number of lines and several of these lines may be connected to ring at the same telephone. It obviously then is an annoyance for the telephone to ring at full volume while the call is in progress. In the past, electromechanical ringers did not lend themselves to automatic off-hook muting. With the introduction of tone signaling and electronic amplifiers as the transmitters of this signaling, automatic off-hook muting becomes a practical feature to include in the key telephone.

Early attempts to solve the problem described above include that found in U.S. Pat. No. 2,972,021, to Bryant et al, which employed a complete redesign of the hook switch contacts and linkages. In this arrangement muting is performed by switching the signaling device in and out with dedicated hook switch contacts. Obviously in a situation such as this field conversion is not practical and special telephone instruments would have to be employed to provide the necessary muting.

Another approach to solve the same problem is shown in British Pat. No. 1,178,695, to Crooks et al, which utilizes a switching contact solely for muting but activation of this contact requires magnetic components mounted in the telephone handset. Again in this situation a special telephone is required with the utilization of unmodified key telephone sets being out of the question.

More recently the Western Electric 7A Key System has provided for signal muting by installing additional contacts on the telephone hook switch and adding a resistor in series with the amplifier speaker. When the telephone is not in use the extra hook switch contacts short the resistor and permit the entire audio output signals to reach the speaker. During a telephone conversation the resistance is included in the output circuit and some of the output signal is dissipated as heat in the resistor. This solution, while effective, requires new contacts on the hook switch. Again the additional contact requires a modification to the telephones basic construction and cannot be considered as a reasonable approach when electronic ringing is to be added to telephones already located in the field.

Accordingly it is the object of the present invention to provide a simple muting circuit which is able to sense an off-hook condition with one of the normal hook switch contacts already existing in standard key telephones. The present invention when added to an audio amplifier permits standard key telephones to be adapted for electronic ringing with automatic off-hook muting without modification to the telephones hook switch arrangement.

SUMMARY OF THE INVENTION

The present invention is intended primarily for inclusion in key telephones associated with key telephone switching systems which incorporate electronic ringing signals. In such telephones incoming ringing signals are reproduced by a signaling transducer that is similar to the receiver capsule normally included in the handset. Incoming signals are amplified by a conventional audio amplifier before application to the signaling transducer.

In the present invention a circuit is provided to mute the incoming signal at the input of the audio amplifier. In the present arrangement tone ringing signals are biased with a negative direct current voltage so no portion of the audio signal is ever more positive than −.6 volts or more negative than −24.6 volts. The input signal is applied to a voltage divider network consisting of two resistors and a diode in series. The output of this voltage divider drives the audio amplifier's input transistor. The third node of the voltage divider connects to the cathode of the diode and the diode's anode is connected to the "A" lead contact of the subscriber's telephone hook switch array. This "A" lead is normally opened completing a circuit to ground when the handset is removed from its cradle. This action when used with an associated key system operates the "A" relay of the key system line card which of course is located external to the telephone subset.

When the hook switch contact operates, the biased input signal passes through the voltage divider to ground. The diode is now forward biased into its linear region, and the audio signal is linearly reduced. When the contact is open, the diode prevents the line card's "A" relay from operating on any ground current passing through the voltage divider to a ground in the audio amplifier or signal source.

BRIEF DESCRIPTION OF THE DRAWING

The single sheet of drawings appended hereto is a schematic circuit diagram of that portion of a telephone subscribers subset involved in reproducing electronically, ringing signals with the inclusion of a muting circuit therefor in accordance with the present invention.

DESCRIPTION OF THE PREFERRED EMBODIMENT

Referring now to the accompanying drawing a portion of a subscribers telephone is shown in schematic circuit form. Only those portions involved in providing reproduction electronically of ringing signals are shown as well as the muting circuitry therefor. It however should be noted that in addition to ringing signals certain key telephone systems provide a facility for voice paging, with such paging being performed over the same circuitry as is normally employed for ringing signals. Accordingly the present invention also provides for muting of voice paging signals as well as incoming ringing signals.

Included in the telephone subset in accordance with the present invention is a terminal T1 connected to a source of incoming ringing signals and/or voice paging signals. Terminal T1 is connected through a level adjusting potentiometer R1 to the input of muting circuit M1. The output of muting circuit M1 is taken through capacitor C1 and applied to amplifier A1 which performs in the usual manner to amplify incoming signals which are coupled through capacitor C2 to an electroacoustic transducer LS1. This transducer may be a unit similar to that employed as a receiver in a traditional handset or might assume the form of a small loud speaker or similar device. A pair of make contacts on the hook switch designated HS1, provide a connection when the hook switch is operated (off-hook) for connecting ground to the muting circuit M1. Also connected to the hook switch and the muting circuit is a relay K1 which is included on the line card of an associated key system.

As may be noted relay K1 is connected to a source of negative potential. If the present telephone were not employed in a key system relay K1 obviously would not be present and instead the muting circuit M1 and hook switch HS1 would be connected in common to a source of negative potential through a resistor whose value would be approximately equal to or greater than the DC resistance of relay K1.

The muting circuit M1 consists of two resistors, R2 and R3 and diode CR1. The ohmic values of resistors R2 and R3 are picked to provide desired signal reduction during muting. Resistor R2 should be selected to be several times less than the amplifiers input resistance. In a practical embodiment of the present invention the input resistance of amplifier A1 was 10,000 ohms. Accordingly a value of 1,000 ohms was selected for resistor R2 and 100 for resistor R3. If the value of resistor R2 is too large, the nonmuted volume of the total amplifier system including volume control R1, muting circuit M1, and audio amplifier A1 would be reduced. Diode CR1 blocks operation of relay K1 when the hook switch is not operated to provide ground potential.

When the hook switch is operated and ground potential is available through the hook switch contacts, diode CR1 will be forward biased to a resistance less than 10 ohms. This occurs because the input signal is never less than the voltage required to forward bias diode CR1. Input signals are thus shunted to ground, with approximately one-tenth of the original signal being available to audio amplifier A1, if the values noted above are employed for resistances R2 and R3. Accordingly the output from amplifier A1 is proportionately lower.

When ground potential is not available, i.e., hook switch HS1 contacts are open, and since input signals are never more than a negative −24.6 volts, diode CR1 is reverse biased to a value of several hundred megohms. This effectively opens the voltage divider ground and permits almost all the input signals to reach amplifier A1. The high resistance exhibited by diode CR1 also prevents current from passing through to the coil of relay K1 to energize it. In this manner relay K1 would release as it should, when the handset is returned to the hook switch.

While but a single embodiment of the present invention has been disclosed it would be obvious to those skilled in the art that numerous modifications may be made without departing from the scope of the present invention which shall be limited only by the claims appended hereto.

What is claimed is:

1. A telephone subscriber subset including: a transducer; a hook switch connected to a source of biasing potential; an input terminal connected to a source of audio signals; and a muting circuit connected between said terminal and said transducer initially operated to couple audio signals from said terminal to said transducer at substantially the same level as received at said terminal; said muting circuit further including a circuit connection to said hook switch wherein biasing potential is conducted to said muting circuit in response to an off-hook condition of said hook switch so that the level of said audio signals conducted from said terminal to said transducer is reduced.

2. A telephone subscriber subset as claimed in claim 1 wherein: said muting circuit comprises a voltage divider connected between said input terminal and said hook switch and including an output to said transducer.

3. A telephone subscriber subset as claimed in claim 2 wherein: said voltage divider comprises first and second resistors connected in series said first resistor also connected to said input terminal and said second resistor also connected to said hook switch, said transducer connected to the junction between said first and second resistors.

4. A telephone subscriber subset as claimed in claim 3 wherein: said muting circuit further includes a diode connected between said second resistor and said hook switch.

5. A telephone subscriber subset as claimed in claim 1 wherein: there is further connected a second source of biasing potential connected to said muting circuit.

6. A telephone subscriber subset as claimed in claim 1 wherein: there is further included an amplifier connected between said muting circuit and said transducer.

7. A telephone subscriber subset as claimed in claim 1 wherein: there is further included level control means connected between said input terminal and said muting circuit.

* * * * *